United States Patent
Sauter et al.

(10) Patent No.: US 6,666,101 B1
(45) Date of Patent: Dec. 23, 2003

(54) DUAL INTEGRATED GAUGE MECHANISM FOR SIMULTANEOUS VISUAL DISPLAY OF ASSOCIATED PARAMETERS

(75) Inventors: Roland Sauter, Villingen-Schwenningen (DE); Margit Sauter née Schwaderer, Villingen-Schwenningen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/509,794

(22) PCT Filed: Sep. 23, 1998

(86) PCT No.: PCT/DE98/02828

§ 371 (c)(1),
(2), (4) Date: May 4, 2001

(87) PCT Pub. No.: WO99/18413

PCT Pub. Date: Apr. 15, 1999

(30) Foreign Application Priority Data

Oct. 2, 1997 (DE) .......................... 197 43 783

(51) Int. Cl.[7] ................................ G01D 7/02
(52) U.S. Cl. ..................... 73/866.1; 73/866.3
(58) Field of Search ............. 73/866.1, 866.3, 73/489, 493, 495; 116/2, 53, 62.4; 29/896.3, 896.31, 896.32, 896.33

(56) References Cited

U.S. PATENT DOCUMENTS

| | | | | |
|---|---|---|---|---|
| 2,105,158 A | * | 1/1938 | Pearce et al. ................. 73/502 |
| 2,209,670 A | * | 7/1940 | Wait .......................... 116/62.4 |
| 2,340,403 A | * | 2/1944 | Morley et al. ................ 73/129 |
| 2,567,193 A | * | 9/1951 | De Rosa et al. ............ 342/400 |
| 2,723,642 A | * | 11/1955 | Manning .................... 116/62.4 |
| 2,799,373 A | * | 7/1957 | Wagner ..................... 477/187 |
| 2,879,940 A | * | 3/1959 | Cornell, III .......... 235/103.5 R |
| 3,573,772 A | * | 4/1971 | Anderson ................... 340/187 |
| 3,890,846 A | * | 6/1975 | Vaidettaro ................. 74/10.41 |
| 3,930,459 A | * | 1/1976 | Barrow .......................... 116/2 |
| 4,841,902 A | * | 6/1989 | Gubin ....................... 116/62.4 |
| 6,557,485 B1 | * | 5/2003 | Sauter ........................ 116/284 |

* cited by examiner

Primary Examiner—Hezron Williams
Assistant Examiner—Charles Garber
(74) Attorney, Agent, or Firm—Fay, Sharpe, Fagan, Minnich & McKee, LLP

(57) ABSTRACT

The invention relates to a measuring instrument, specifically for the registration devices in automobile technology with at least a first and second independently activatable driving mechanism and with respectively a first driven shaft (15; 17), which can respectively be twist-proof connected with an indicator element, whereby the driven shaft (15) of the second driving mechanism is conducted co-axially through the driven shaft (17), designed as hollow shaft, of the first driving mechanism and protrudes, with its extremity, beyond the extremity of the driving shaft designed as hollow shaft.

16 Claims, 4 Drawing Sheets

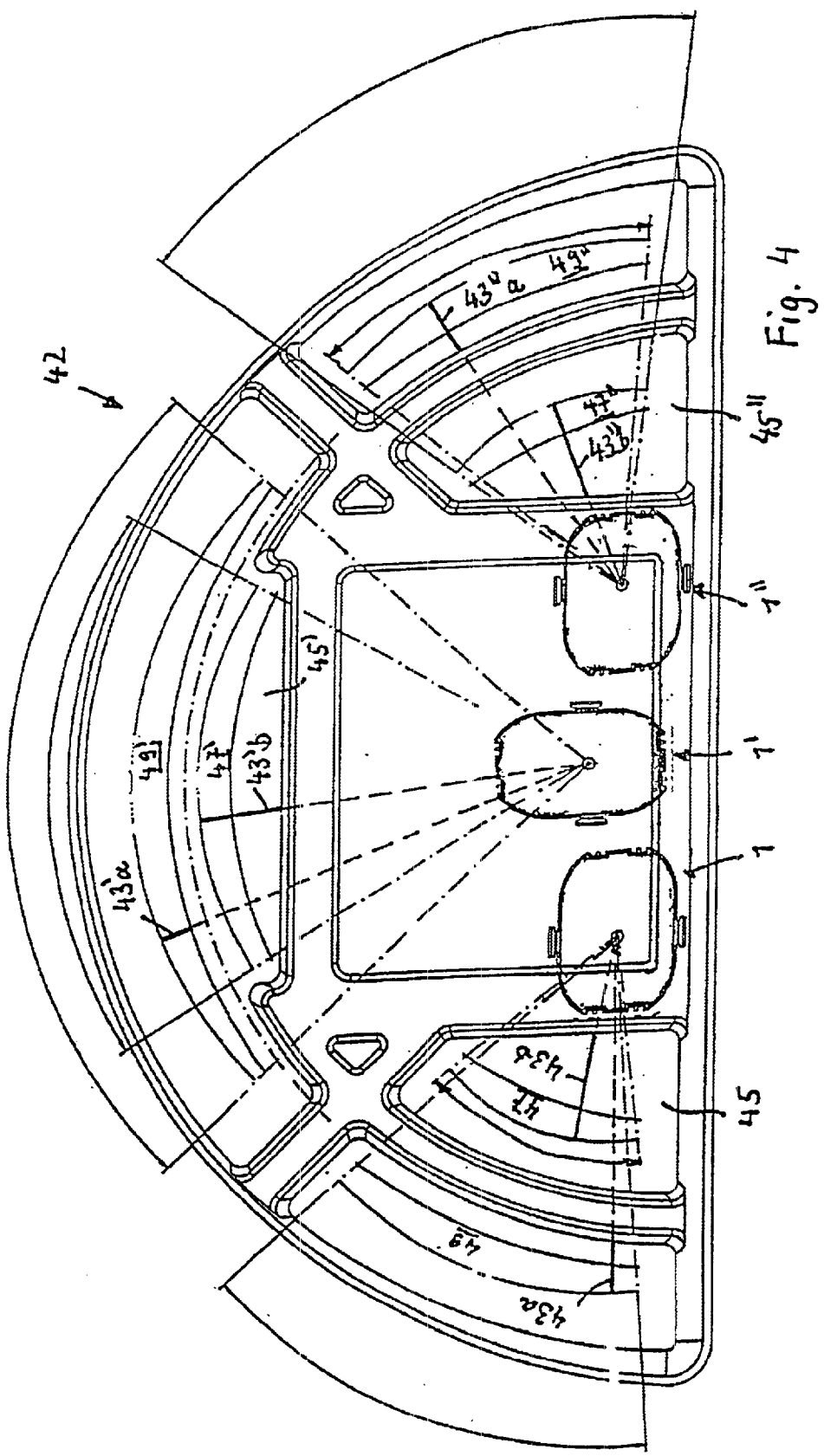

US 6,666,101 B1

DUAL INTEGRATED GAUGE MECHANISM FOR SIMULTANEOUS VISUAL DISPLAY OF ASSOCIATED PARAMETERS

BACKGROUND OF THE INVENTION

The subject invention is directed to the art of measuring systems and, more particularly, to display devices such as gauges or the like for visual presentation of associated parameters.

Measuring systems including gauges of the type under consideration are commonly used in the automotive arts to display associated parameters derived from a motor vehicle such as, for example, vehicle speed, engine rotational speed in revolutions per minute, fuel tank levels, and other parameters. Typical analog display instruments include a movable indicator needle that is operated by means of an underlying control mechanism such as, for example, a stepping motor or a rotor coil. The indicator needle typically extends adjacent a graduated scale providing indicia of the value range of the parameters of interest. The rotor coil or stepping motor in the underlying measuring system control actuates motion of the movable indicator needle relative to the graduated scale for a visual presentation of the subject parameter.

In many known display systems, separate measuring systems are typically used for the display of each individual parameter. Each separate measuring system includes a set of connection contacts for supplying the respective signals to the measuring system from the corresponding parameters. Also, each measuring system typically includes a separate driven shaft provided in a housing or the like of the measuring system. The driven shaft is typically connected with an indicator needle which is moved relative to a graduated scale in a manner described above.

One problem exists, however, with respect to combination instruments of the type described above. Frequently, the desire to place the required number of measuring systems within the housing of a single combined gauge or instrument presents a space constraint problem. Often, it is desired to arrange the analog displays in close proximity to each other. However, the measuring systems that drive the analog displays often restrict the ability to do so.

It is therefore desirable to provide a measuring system such as an integrated automotive gauge mechanism for simultaneous visual display of associated parameters relating to the motor vehicle that is inexpensive, occupies a small space, and has the ability of displaying the status of a plurality of monitored parameters simultaneously.

SUMMARY OF THE INVENTION

The subject invention provides a compact dual integrated gauge mechanism for visual display of at least two associated parameters simultaneously. The gauge system includes first and second gear mechanisms. A first driven shaft adapted to carry an indicator needle or the like extends from a housing of the measuring gauge and includes a hollow opening extending therethrough. A second driven shaft extends from the housing and is arranged coaxially in the hollow opening of the first driven shaft. A free end of the second driven shaft extends beyond the free end of the first driven shaft. At least one first independently operable drive mechanism is connected with the first driven shaft through the first gear mechanism. Similarly, at least one second independently operable drive mechanism is connected with the second driven shaft through the second gear mechanism.

The coaxial arrangement of the two driven shafts extending from two respectively independently actuatable controls enables analog display of at least two parameters within an extremely small area. The present invention conserves on space both with respect to the display elements or the display scales as well as with respect to the measuring system.

In addition, the coaxial arrangement of the first and second driven shafts permits positioning of two indicator needles or hands in a stacked relationship and pivotable about a single axle point. It is to be appreciated that this arrangement of the indicator needles enabled by the present invention is extremely beneficial in certain instances such as, for example, in the representation of two or more parameters using a single round instrument layout.

In accordance with one aspect of the invention, the measuring system mechanism includes at least one first and one second independently activatable drive mechanism disposed in a single housing. Preferably, the housing comprises an upper component and an intermateable lower housing component. Preferably, each of the first and second drive mechanisms are identically formed resulting in the benefit of reduced manufacturing costs due mainly to the minimized part count in the overall measuring system mechanism. The invention is conducive to high volume industrial production resulting in significant cost savings.

In accordance with another aspect of the invention, the first and second drive mechanisms are disposed in the housing in a mutual inverted mirror image position relative to a virtual reflection plane passing through the housing. Preferably, each of the first and second drive mechanisms are substantially flat or very narrow. Accordingly, the mirror-inverted arrangement of the first an second drive mechanisms permits and extremely flat construction of the subject measuring instrument.

In accordance with yet another aspect of the invention, the first and second drive mechanisms are preferably respectively connected via an intermediate pinion to a drive pinion connection in a torsion-proof manner to each respective driven shaft. Accordingly, a gear unit is provided at minimal cost for transmitting the driving movements of the first and second drive mechanisms to the driven shafts.

In accordance with another aspect of the invention, the first driven shaft having a hollow opening extending therethrough is integrally formed with a first drive pinion. Preferably, the integral first drive pinion and first driven shaft is formed as an extrusion-molded plastic component.

In accordance with a still further aspect of the invention, a second pinion member is disposed on the second driven shaft in a manner to prevent relative axial and rotational movement therebetween. The lower extremity of the second driven shaft is positioned in the housing and rotatably received in a positioning recess formed by the first housing member. In addition, a support bridge member is provided in the housing for rotatably supporting the second driven shaft at a second point directly or in the area of a retainer collar formed by the second drive pinion. The driven shaft can be inserted onto a corresponding support pin in the lower half of the housing and locked or pressed together with the housing. The retainer bridge member thus permits simple assembly and support of the second driven shaft and of the second drive pinion.

In accordance with still yet further an aspect of the invention, the retainer bridge member is formed in a fashion to preferably simultaneously serve to axially locate a first intermediate pinion rotatably positioned within the housing between the first drive mechanism and the first driven shaft. To that end, the first intermediate pinion is preferably inserted on a support pin disposed in the bottom of the housing. Axial movement of the first intermediate pinion is limited by the underside of the support bridge member.

In accordance with a further aspect of the invention, the support bridge member includes a guide sleeve portion formed thereon for rotatably supporting the first drive pinion. The guide sleeve portion of the support bridge member includes an inner surface adapted to engage the first driven shaft. The first driven shaft extends through the guide sleeve portion of the support bridge member for guiding the first driven shaft through the opening formed in the first driven shaft. Preferably, the guide sleeve portion of the support bridge is formed in such a manner that it engages the hollow shaft portion of the first driven shaft over a sufficiently large axial region to provide stable support of the first driven shaft or the first drive pinion connected therewith.

In addition, the first driven shaft is rotatably supported in the upper portion of the housing with a centering collar provided on the top portion of the housing. The centering collar preferably is also functional to adapt the subject measuring system mechanism for mounting onto an associated support member such as an automotive dash board or the like.

In accordance with yet a further aspect of the invention, the housing cover is adapted to axially locate the first intermediate pinion which is preferably inserted upon a support pin disposed in the lower half of the housing. In this manner, by providing the support bridge member, combined with the top and bottom portions of the housing, the subject gauge mechanism is formed in an extremely simple and compact fashion and further, with a substantially flat overall construction.

Still other aspects, advantages, and benefits the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
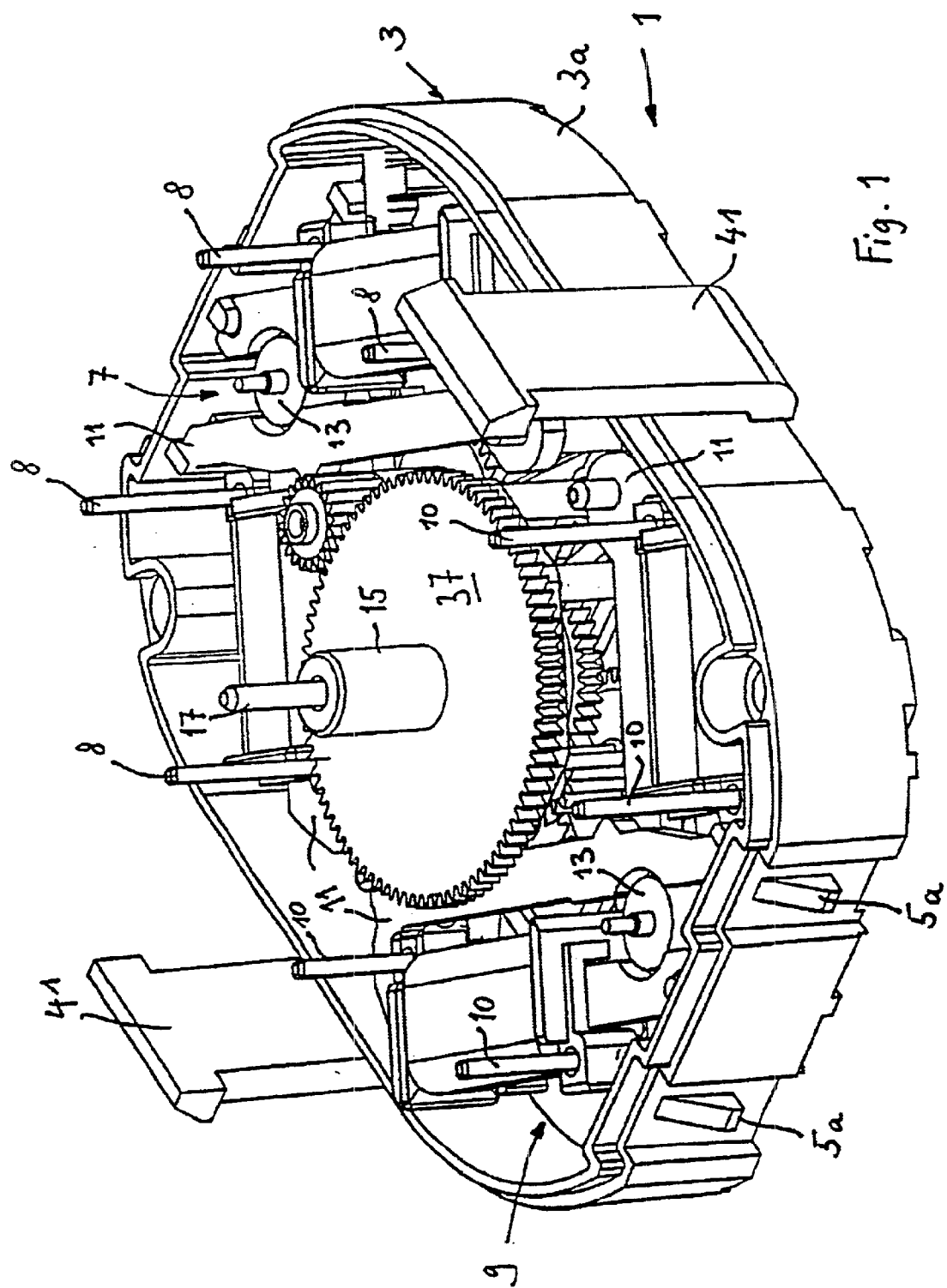
FIG. 1 is a perspective view of an integrated dual measuring mechanism formed in accordance with the preferred embodiment of the invention with a top lid portion of the housing removed.
Figure 2:
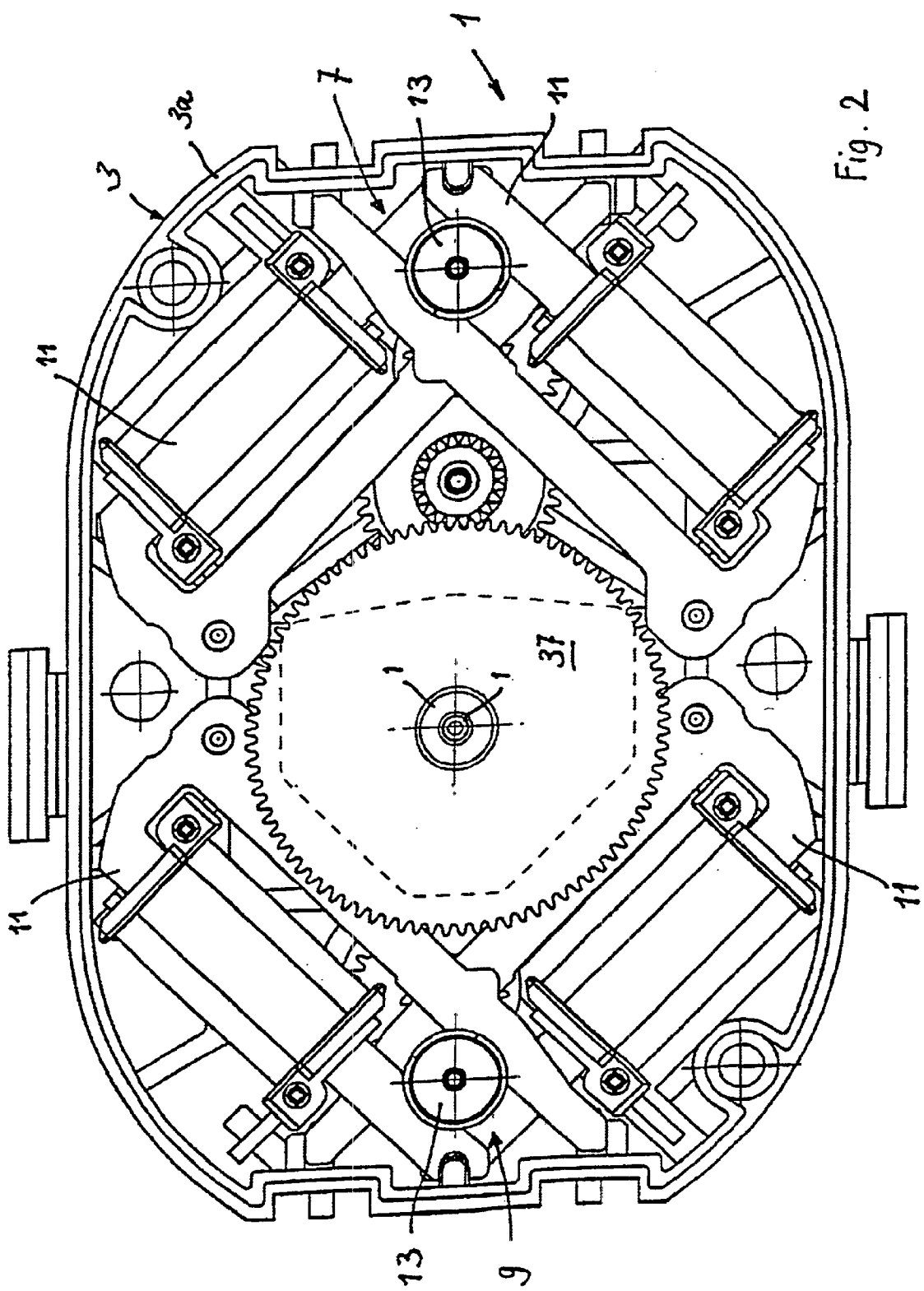
FIG. 2 is a top plan view of the measuring mechanism shown in FIG. 1.
Figure 3:
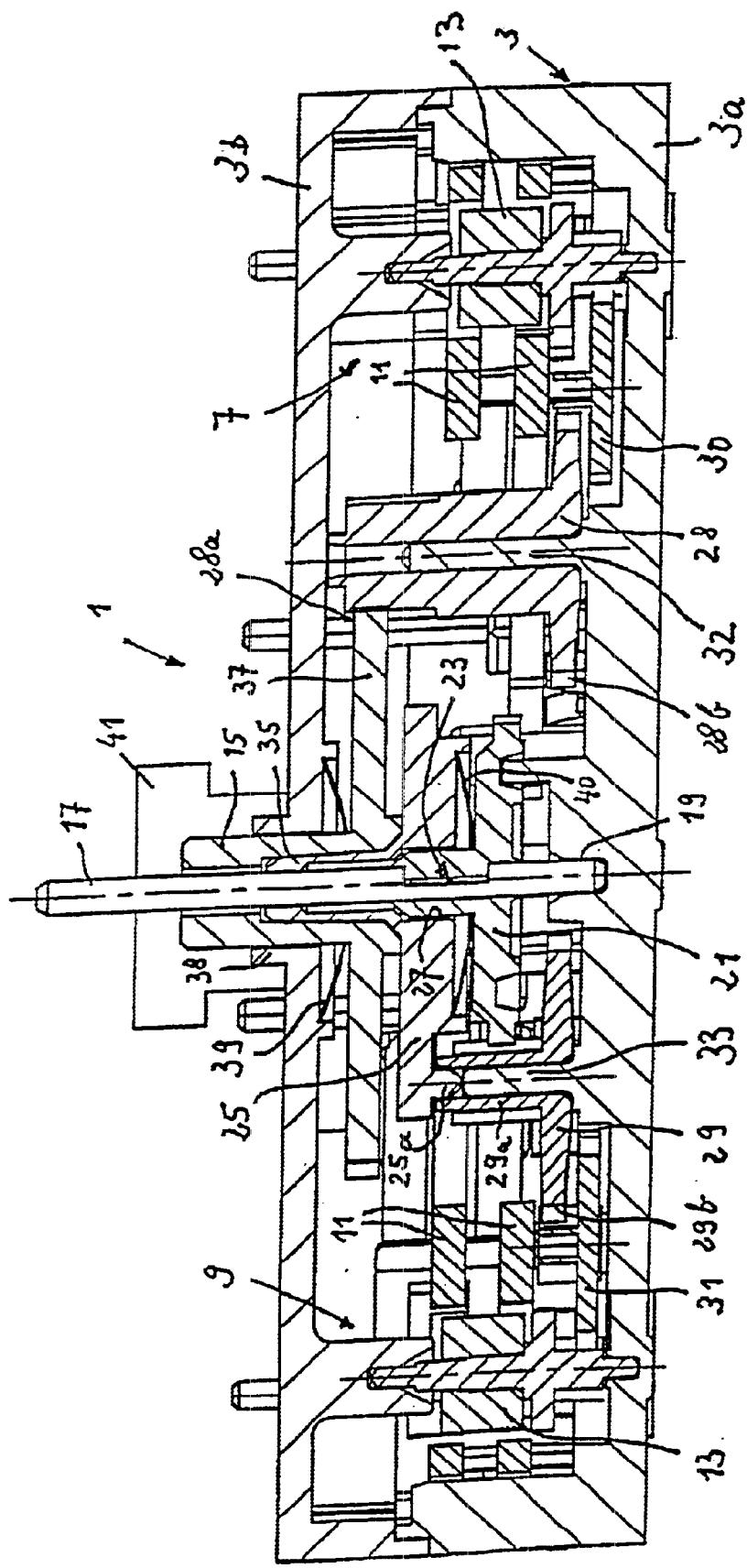
FIG. 3 is a cross sectional view of the measuring mechanism shown in FIG. 1 taken on a plane through the coaxial driven shafts; and, FIG. 4 is a schematic representation of a combination instrument system for use in motor vehicle applications using several measuring systems of the type formed in accordance with the present invention and shown in FIGS. 1–3.

Referring now to the drawings wherein the showings are for the purposes of illustrating the preferred embodiment of the invention only and not for purposes of limiting same, the overall arrangement of the preferred form of an integrated dual measuring mechanism formed in accordance with the invention can best be seen with reference to FIGS. 1–3. As shown therein, the registration instrument includes a housing 3 preferably formed in two parts including a lower housing component 3a and an upper housing component 3b (FIG. 3). Preferably, the upper and lower housing members are selectively connectable using a locking mechanism 5. As shown best in FIG. 1, for this purpose, the lower housing component 3a includes locking projections a which are adapted to operate jointly with a set of corresponding locking springs (not shown) provided on the upper housing component 3b.

As shown in the figures, first and second independently actuatable drive mechanism 7, 9 are arranged in the lower housing component 3a. Preferably, the first and second drive mechanisms are formed as stepping motors of known design. In addition, it is preferred that the first and second drive mechanisms 7, 9 are designed identically to result in a reduction in the number of different components that are necessary to construct the subject measuring device. One benefit is a reduced inventory requirement.

Each of the stepping motors forming the first and second drive mechanisms 7, 9 comprise two vertically arranged U-shaped stators 11 having parallel spaced apart outwardly extending legs. A rotor 13 is disposed between opposite legs of each U-shaped stator 11. As seen best in FIG. 2, the pair of stepping motors 7, 9 are disposed in the housing in a mutual inverted mirror image position relative to a virtual reflection plane passing through the housing substantially through first and second coaxial driven shafts 15, 17. This arrangement of the drive mechanism components results in an extremely space efficient and simultaneously flat design of the subject measuring system 1.

In order to further ensure a very small compact size and flat construction of the subject measuring system, a pair of driven shafts 15, 17 are arranged to extend coaxially outwardly from the housing 3. Preferably, the first driven shaft 15 includes a hollow opening extending therethrough and is connected to the first drive mechanism 7. The second driven shaft 17 extends coaxially through the central opening of the first driven shaft and is connected to the second drive mechanism or stepping motor 9. Preferably, as shown in FIG. 3, the lower end of the second driven shaft 17 is received in a positioning recess 19 formed in the bottom of the lower housing component 3a. The second driven shaft 17 can be formed of any material but, preferably, is formed as a metal pin provided with a second drive pinion 21 attached directly thereto preferably by an extrusion-molding process. A recess 23 is formed in the second driven shaft 17 to ensure a twist-proof connection between the extrusion molded driving pinion 21 and the metal pin forming the second driven shaft 17. Essentially, the body of the driving pinion 21 engages the recess 23 to lock the pinion onto the second driven shaft.

With continued reference to FIGS. 1–3 but with particular attention to FIG. 3, a support bridge member 25 is disposed within the housing 3 and preferably inserted onto the second driven shaft 17. The support bridge member 25 includes a passage opening 27 adapted to receive the body of the second driven shaft 17 or the collar of the second driving pinion 21 which is extrusion-molded onto the second driven shaft 17. As a result of this arrangement, the second driven shaft 17 is guided in a second region so that the second driven shaft is securely guided relative to the first driven shaft and the housing.

Preferably, the second drive pinion 21 cooperates with a second intermediate pinion 29 which is, in turn, driven by a pinion member 31 associated with the second drive mechanism 9. The intermediate pinion 29 includes an upper gear portion 29a which cooperates with the gear of the drive pinion 29 and a lower gear portion 29b which engages the gear of the driven pinion 31 of the second drive mechanism 9. Preferably, the second intermediate pinion is carried on a support pin 33 which is formed to extend from the bottom of the lower housing component 3a. The second intermediate pinion is axially located by engagement, on a top end, with a counter-support pin 29a provided on the underside of the support bridge member 25. As shown, preferably, the counter-support pin 25a engages the upper end in the central support bore of the second intermediate pinion 29. Preferably, the axial height of the intermediate pinion 29 is selected to assure a precise guidance of the intermediate pinion by a dimension that it protrudes by a predetermined projection amount beyond the end of the support pin 33.

Correspondingly, the length of the counter-support pin 25a disposed on the underside of the support bridge member 25 is dimensioned in such a manner that it acts upon the upper end of the support pin 33 without thereby exerting high frictional force upon the surface of the intermediate pinion 29. This arrangement of parts ensures unimpeded free rotation of the intermediate pinion 29 without the need to precisely axially locate the pinion 29 relative to the associated components or the housing.

With still continued reference to FIG. 3, a guide sleeve 35 is provided on the upper portion of the support bridge member 25. An interior surface of the guide sleeve 35 is adapted to engage and guide the second driven shaft 17. In addition, the guide sleeve 35 serves as a support for the first driven pinion 37 preferably joined as a single piece component with the first driven shaft 15. In accordance with the present invention, preferably, the first driven shaft 15 and the first driven pinion 37 are formed integrally in a one-piece extrusion-molding plastic component process.

As shown, the first driven shaft 15 extends through the upper housing element 3b through a passage opening provided therein. A fixation collar 38 is provided on the upper side of the upper housing element 3b for effecting improved guidance of the first driven shaft 15. In addition, the fixation or mounting collar 38 is also useful for adapting the subject measuring instrument 1 for connection onto an associated support element (not shown) such as a conductor plate or a motor vehicle instrument panel.

In addition to the set of components described above, a resilient spring element 39 is provided in the housing to act upon the upper side of the first driving pinion 37. The first resilient spring element 39 is supported on top by the underside of the upper housing element 3b. The resilient spring element 39 serves a dual function namely the axial fixation of the driving pinion 37 in the position illustrated and, at the same time, producing a desired braking effect between the driving pinion 37 and the housing 3.

In a similar fashion to the above, a second resilient spring element 40 is disposed between the second driving pinion 21 and the bottom side surface of the support bridge member 25. Again, the desired braking effect is obtained by the interaction of the second resilient spring member 40 with the support bridge member 25 and second driving pinion 21. Further, the second resilient spring member 40 is functional to axially locate the second driving pinion in the position shown.

In accordance with the present invention, the first driving pinion 37 cooperates with a first intermediate pinion 28, which is in turn driven by a first pinion member 30 associated with the first drive mechanism 7. The first intermediate pinion 28 includes a lower gear portion 28b as well as an upper gear portion 28a which respectively engage gear portions formed on the driven pinion 30 and the first driving pinion 37, respectively.

A support pin member 32 is formed extending from the bottom housing component 3a for rotatably supporting the first intermediate pinion 28. A counter-support pin provided on the underside of the upper housing component 3b serves to axially locate the first intermediate pinion 28 in the position shown. Preferably, the counter-support pin engages with the passage opening of the first intermediate pinion and supports itself on the surface of the support pin 32. The respective length of the support pin 32 and of the counter-support pin is preferably dimensioned in such a fashion that the intermediate pinion 28 is fixed an axial direction without being acted upon adversely by any significant frictional or braking force.

Turning briefly back to FIG. 1, a first set of electrical connection contact 8 are provided for electrical connection to the first drive mechanism 7. Similarly, a second set of electrical connection contacts 10 are provided for electrical connection with the second drive mechanism 9. As illustrated, the first and second sets of electrical connection contacts extend outwardly from the upper housing component 3b. This arrangement of electrical connection contacts is beneficial in that the subject measuring instrument 1 can be installed on an associated assembly component or mounting plate by receiving the connection contacts into appropriately located electrical contacting bores provided on the support plate. Electrical contact establishment is simply formed by soldering, crimp connecting, or the like.

In order to mechanically attach the subject measuring instrument 1 onto an associated assembly component or support member, a set of locking tongues 41 are preferably provided on the lower housing component 3a. The locking tongues are adapted to engage corresponding recesses or the like formed on the associated assembly component. In addition, the subject measuring system 1 can also be connected with an associated assembly element by means of screw connections, or other attachment apparatus.

With reference next to FIG. 4, a schematic representation of a combination instrument for use in a motor vehicle is shown. FIG. 4 depicts three (3) dual integrated gauge systems 1, 1', and 1" each being formed as shown in FIGS. 1–3. The three dual gauge systems are integrated into a composite gauge system 42. Each of the dual measuring systems 1, 1', and 1" is respectively connected with two indicator needles 43a, 43b, 43'a, 43'b, or 43"a, 43"b. The longer of the two indicator needles is preferably passed under a diaphragm 45, 45', 45" on which is respectively provided a scale 47, 47', 47" for visually illustrating the parameter to be represented by the respective shorter indicator needle 43b, 43'b, 43"b.

In a similar fashion, diaphragms with corresponding scales 49, 49', 49" for representation of the respective parameters are further provided underneath the longer indicator needles 43a, 43'a, 43"a.

Utilization of the dual measuring system 1, 1', 1" formed in accordance with the present invention results in an extremely simple and space saving construction in a combination instrument system 42.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. Apparatus for use in an associated gauge system to simultaneously visually display at least two parameters by movement of a pair of gauge indicator members using first and second drive mechanisms, the apparatus comprising:

a housing including selectively connectable opposing first and second members;

a first driven shaft movable in response to said associated first drive mechanism, the first driven shaft having a free end extending through the second housing member and being adapted to carry a first associated gauge indicator member;

a second driven shaft movable in response to said associated second drive mechanism, the second driven shaft having a free end extending through a central opening formed in said first driven shaft and extending through the second housing member and being adapted to carry a second associated gauge indicator member;

a support bridge member disposed between the first driven shaft and the second driven shaft, the support bridge member engaging and rotatable supporting the first driven shaft and the second driven shaft relative to the housing;

the first housing member defining a positioning recess rotatably receiving a second end of the second driven shaft opposite said free end;

a first resilient spring member for biasing said first driven shaft away from said second housing member and into contact with said support bridge member; and, a second resilient spring member for biasing said second end of the second shaft away from said support bridge member and into engagement with said positioning recess.

2. The apparatus according to claim 1 wherein:

the first driven shaft includes a first drive pinion for operatively connecting the first driven shaft with the associated first drive mechanism;

the second driven shaft includes a second drive pinion for operatively connecting the second driven shaft with the associated second drive mechanism; and, the second resilient spring member biases the second drive pinion carried on the second driven shaft away from said support bridge member and into engagement with said positioning recess.

3. The apparatus according to claim 2 wherein the support bridge member includes an upper sleeve portion having an outer surface adapted to engage an inner surface of said central opening formed in the first driven shaft and having an inner surface adapted to engage said second driven shaft, the upper sleeve portion holding the second driven shaft centered within said central opening formed in the first driven shaft.

4. A measuring unit for display devices in associated motor vehicle equipment, the measuring unit comprising:

a housing including an upper housing part and a lower housing;

a first drive and a second drive in the housing, said first and second drives being respectively connected to a first output shaft and a second output shaft by means of first and second gear mechanisms, respectively, said output shafts being adapted for connection with an associated display element;

the second output shaft being received axially through a passageway formed in the first output shaft, a lower end of the second output shaft being mounted so as to be capable of rotating in a portion of said housing;

the first gear mechanism including a drive pinion which is non-rotatably connected with the first output shaft and which is operatively connected with the first drive;

the second gear mechanism including a second drive pinion which is connected axially and non-rotatably with the second output shaft and is operatively connected with the second drive; and, a bearing bridge received on an end of the second output shaft and which rotatably supports the second output shaft in the region of a securing collar of the second drive pinion and which serves simultaneously as a bearing for the first drive pinion and for the first output shaft which is connected fixedly in terms of rotation thereto.

5. The measuring unit according to claim 4 wherein a free end of the second output shaft projects beyond a free end of the first output shaft.

6. The measuring unit according to claim 4 wherein the first drive and the second drive are substantially identical.

7. The measuring unit according to claim 4 wherein the first drive and the second drive are arranged in the housing in a mirror-inverted relationship relative to a plane.

8. The measuring unit according to claim 4 wherein:

the drive pinion is connected fixedly in terms of rotation to the first output shaft and is connected to the first drive via a first intermediate pinion; and, the second drive pinion is connected fixedly in terms of rotation to the second output shaft and is connected to the second drive via a second intermediate pinion.

9. The measuring unit according to claim 4 wherein the first output shaft is a hollow shaft and is integrally formed with the first drive pinion.

10. The measuring unit according to claim 4 further including a spring element for axially securing the second drive pinion between an underside of the bearing bridge and the upper side of the second drive pinion.

11. The measuring unit according to claim 4 wherein the bearing bridge serves simultaneously as an axial securing means for the second intermediate pinion which is rotatably mounted in the housing.

12. The measuring unit according to claim 4 wherein the bearing bridge includes a guide sleeve adapted to receive and engage the second output shaft, the guide sleeve forming a bearing sleeve for the first drive pinion.

13. The measuring unit according to claim 4 wherein the guide sleeve engages the first output shaft within a hollow opening provided therein.

14. The measuring unit according to claim 4 wherein the first output shaft is rotatably mounted in the upper side of the housing and, further including:

a centering collar adapted to secure the measuring unit in an associated mounting part.

15. The measuring unit according to claim 4 further including first connecting contacts associated with the first drive and second connecting contacts associated with the second drive extending from the upper side of the housing.

16. The measuring unit according to claim 4 further including attachment means adapted to secure and hold the measuring unit on an associated mounting member.

* * * * *